Patented Aug. 16, 1949

2,479,226

UNITED STATES PATENT OFFICE 2,479,226

EMULSION POLYMERIZATION OF UNSATURATED ORGANIC COMPOUNDS

Richard S. George, Wilmington, Del., assignor to Hercules Powder Company, Wilmington, Del., a corporation of Delaware No Drawing. Application October 24, 1945, Serial No. 624,329

10 Claims. (Cl. 260—82.3)

This invention relates to an improved process for the emulsion polymerization of unsaturated compounds and more particularly to an improved process of polymerizing vinyl compounds to provide improved synthetic rubber-like materials.

It is well known that unsaturated compounds, particularly those containing the vinyl group, may be advantageously polymerized in aqueous emulsion. Synthetic rubber-like materials have been prepared by polymerizing in aqueous emulsion, diolefins, halogen derivatives of diolefins, or other substituted diolefins, or by interpolymerizing diolefins with other compounds containing a vinyl group such as styrene, acrylic acid esters and acrylic acid nitrile. Polymers such as polyvinyl halides, polyvinyl acetate, polystyrene, polymethyl methacrylate and various other addition polymers also have been prepared by polymerization in aqueous emulsion. Soaps of fatty acids are the most commonly used emulsifying agents for polymerizations of this type.

Fatty acid soaps, although effective emulsifying agents for the polymerization of vinyl compounds, are not sufficiently water-soluble and are, therefore, quite difficult to remove from the polymerization products. In the case of rubber-like polymers, the fatty acid soap remaining in the polymer is converted to free fatty acid when salt and acid are added as is commonly done in the precipitation of the polymer. Fatty acids decrease the tack of the rubber and should, therefore, be removed from it. Their complete removal is difficult.

Now in accordance with this invention it has been found that the alkali metal salts of dehydrogenated tall oil may be used as emulsifying agents with very advantageous effects for the polymerization of vinyl compounds which are capable of being polymerized by a peroxide catalyst, the polymer from this process having superior plasticity, elongation at break, tear strength, tack and optimum cure time.

The alkali metal salts of dehydrogenated tall oil have been found to be excellent emulsifying agents in the preparation of polymers by emulsion polymerization. They also are advantageous in making it unnecessary to wash the emulsifying agents from the polymers since the dehydrogenated tall oil, in contrast to fatty acids, does not weaken the polymers. Furthermore, the presence of dehydrogenated tall oil has been found to increase materially the tack in rubbery polymers such as the copolymer of butadiene and styrene. The physical properties of these polymers after cure also are improved.

The following examples are illustrative of the preparation of polymers by emulsion polymerization and the products thereof in accordance with this invention. All parts given in the examples represent parts by weight.

*Example I*

A solution of palladous chloride in dilute hydrochloric acid, the solution containing 0.40 part palladium, was added to 10.0 parts powdered activated carbon (Norit A) and the carbon covered with added distilled water. The slurry so obtained was reduced with hydrogen under 4 atmospheres of pressure for 30 minutes at 25° C., agitation being maintained during the reduction. The slurry was filtered and the resulting palladium-carbon catalyst washed with distilled water.

Two hundred forty-three parts of tall oil having an approximate analysis of 45% resin acids, 48% fatty acids and 7% unsaponifiable material was fractionally distilled at a pressure of 11 mm. of mercury. The fraction amounting to 150 parts and boiling between 215° C. and 255° C. was collected. One hundred forty-five parts of this fraction was heated to 240° C. in an atmosphere of carbon dioxide and 10 parts of the palladium-carbon catalyst added. The mixture was heated at 240° C. with stirring for 30 minutes after which it was cooled, diluted with diethyl ether and the catalyst removed by filtration. Following removal of the ether by evaporation a dehydrogenated distilled tall oil was obtained having the following characteristics: acid number, 180.5; bromine number, 39; dehydroabietic acid, about 20%; abietic acid, nil.

Five parts of the dehydrogenated tall oil was charged into a glass polymerization vessel and neutralized with aqueous sodium hydroxide. To this neutral soap solution 0.3 part potassium persulfate, 0.5 part lauryl mercaptan, 75 parts butadiene and 25 parts styrene were added. The reaction mixture contained 180 parts water by virtue of the aqueous sodium hydroxide, and additional water, if needed. The polymerization vessel then was sealed and the reaction mixture agitated at 50° C. for 14 hours. The polymerizate emulsion was then run into an open vessel containing 10 parts of an aqueous solution of phenyl-beta-naphthylamine, stripped of the excess butadiene and the polymer precipitated by the addition of an excess of a saturated salt solution. The precipitated polymer was washed with water until alkali-free, then with alcohol, and finally was dried to constant weight on a mill. A yield of 81.6% polymer was obtained.

*Example II*

Utilizing the dehydrogenated tall oil prepared in Example I, four other polymerizations, duplicating that of Example I, were carried out. The polymer yields were as follows: 80.2%, 81.4%, 83.0%, 79.6%.

*Example III*

A tall oil having an approximate analysis of

35% resin acids, 50% fatty acids and 15% unsaponifiable material was distilled and dehydrogenated according to the procedure of Example I. The resulting material was utilized in the polymerization of butadiene and styrene following the process of Example I. A 79% yield of polymer was obtained.

*Example IV*

Utilizing the dehydrogenated tall oil prepared in Example I, 100 parts of styrene was polymerized following the process of Example I. Duplicate polymerizations gave 100.0% yields of polystyrene.

*Example V*

One hundred parts of methyl methacrylate was polymerized under the conditions used in the preceding example. Duplicate runs gave polymethyl methacrylate yields of 100.0% and 97.6%.

*Example VI*

A polymerization was made following the process of Example I but substituting 25 parts of acrylonitrile for the 25 parts of styrene. The yield of butadiene-acrylonitrile copolymer was 100.0%.

*Example VII*

Duplicate polylmerizations were made following the procedure of Example I with the exception that 75 parts of isoprene was used to replace the 75 parts of butadiene. The yields of isoprene-styrene copolymer were as follows: 76.8%, 76.4%.

A sample of the tall oil of Example I prior to its distillation and dehydrogenation was tested in the emulsion polymerization of butadiene and styrene following the technique described in Example I. Duplicate tests were made but in neither case was it possible to detect the presence of any polymeric material.

The dehydrogenated tall oil soaps described in accordance with this invention are prepared by neutralization of dehydrogenated tall oil with an alkali metal compound basic in nature. Alkali compounds suitable for this purpose are the hydroxides, carbonates, etc., of sodium, potassium, etc. The soap may be prepared in situ, i. e., the dehydrogenated tall oil may be added to the monomeric material and a solution of alkali added or the soap may be incorporated in the form of a paste or in the form of a dry soap.

Tall oil is a by-product in the manufacture of paper pulp by digestion of wood with alkaline liquors such as alkaline solutions of sodium sulfide. Crude tall oil consists of a mixture of resin and fatty acids in roughly equal proportions together with minor amounts of neutral, unsaponifiable materials containing mainly plant sterols.

Dehydrogenated tall oil may be prepared by the dehydrogenation of either crude or refined tall oil. The dehydrogenation reaction is carried out by contacting the tall oil at an elevated temperature with an active hydrogenation catalyst in the absence of added hydrogen to effect a dehydrogenation or disproportionation reaction upon the resin acids contained in the tall oil. Catalysts such as palladium, platinum, nickel, Raney nickel, etc., are suitable. The catalyst may be supported on a carrier such as powdered or granulated activated carbon, granular activated alumina, barium sulfate or silica gel. Dehydrogenation with a palladium catalyst, for example, may be conducted either by a batchwise or continuous procedure. Thus, the tall oil may be agitated with about 5 to about 20% by weight of a palladium catalyst supported on activated carbon (1 to 5% palladium) at about 150° C. to about 350° C. for about 0.5 hour to about 5 hours. In the continuous process the tall oil flows over the supported palladium catalyst at a temperature within the range of about 225° C. to about 300° C. to provide a contact time of about ¼ hour to about 1 hour. The product may be separated from the catalyst by centrifuging, distillation or by dissolution in a solvent followed by filtration. If only a small quantity of the catalyst is used, it may be left in the product.

It is often advantageous to refine the tall oil prior to its dehydrogenation. Various methods such as distillation, solvent extraction, absorbent earth refining and the like are satisfactory, for they give products which are lighter in color and more nearly odorless. Such refined tall oils may, or may not differ greatly in composition from the crude material depending upon the conditions used. Distillation, for example, may cause considerable alteration in composition due to the fact that it is possible to separate a fraction consisting almost exclusively of fatty acids and another fraction consisting largely of resin acids. In accordance with this invention it usually is desirable that the tall oil be distilled, since the distillation separates the tall oil from certain high boiling constituents which are normally present and which exert inhibitory effects on both the dehydrogenation and polymerization processes. The distillation should be carried out under reduced pressure. The pressure may vary from about 0.5 to about 25 mm. of mercury and the distillation temperature at these pressures will fall within the range of about 150° C. to about 300° C.

Although the inhibitors in tall oil can be at least partially removed by distillation or other refining procedures, it is preferable to remove them by pretreating the tall oil with a spent catalyst resulting from previous tall oil dehydrogenations. Spent palladium and nickel catalysts are particularly useful in such a pretreatment and the refined tall oil can then be dehydrogenated more readily than the crude product. The pretreatment with spent catalysts may be carried out under the same conditions as those used in the dehydrogenation step.

While fatty acid soaps are the most commonly used soaps for emulsion polymerization reactions, they have many disadvantages as noted above. Ordinary rosin soaps are not practical emulsifying agents for these reactions since they result in a yield of less than 25% of polymer. Tall oil, being a mixture of resin and fatty acids in roughly equal proportions, is, in the form of its alkali metal soaps, also unsatisfactory as the emulsifying agent in polymerization reactions. Tall oil which has been refined only by distillation also is unsatisfactory. By using the soaps of dehydrogenated tall oil as emulsifying agents, however, the yield of polymer is high at a satisfactory rate or comparable to that of fatty acid soaps. The dehydrogenated tall oil comprises essentially a mixture of fatty acids and dehydrogenated resin acids, the principal constituent of the latter being dehydroabietic acid. It is desirable that the dehydrogenated resin acids in the dehydrogenated tall oil contain at least 45%, and perferably at least 50%, dehydroabietic acid, and less than 1% abietic acid and be free of other inhibitors. Generally speaking, the entire dehydrogenated tall oil should be free of polymerization inhibitors.

In contrast to fatty acids which weaken synthetic rubbers, dehydrogenated tall oil has been found to produce beneficial effects on these rubbers. The plasticity, elongation at break, tear strength, and tack are improved by the presence of dehydrogenated tall oil in the polymeric material. An amount of dehydrogenated tall oil up to about ·5% is particularly advantageous.

One means of incorporating small amounts of dehydrogenated tall oil in a rubbery polymer is through the use of alkali metal salts of dehydrogenated tall oil as emulsifying agents in the preparation of the polymer as shown in the foregoing examples. By carrying out the polymerization in an aqueous emulsion in the presence of these soaps, the addition of acid and salt in the precipitation of the polymer precipitates dehydrogenated tall oil in the polymer. The polymer may then be washed until about 0 to about 5% of dehydrogenated tall oil remains in the polymer. This has the advantage of eliminating the necessity for washing the polymer completely free of the emulsifying agent as has to be done in the case of fatty acid soaps, and at the same time permits a means of simply and uniformly incorporating a small amount of dehydrogenated tall oil in the polymerized material.

The rubber-like polymers formed by emulsion polymerization of butadiene and styrene in the presence of dehydrogenated tall oil soaps and containing, as a result thereof, an amount of dehydrogenated tall oil up to about 5%, exhibit high tensile strengths and elongations when compounded and vulcanized. The tack, building properties and mill behavior in the unvulcanized state are also noticeably improved.

The compounds which may be advantageously polymerized in aqueous emulsion by means of the soaps of dehydrogenated tall oil include the conjugated butadiene hydrocarbons, butadiene and its derivatives such as isoprene, dimethyl butadiene, chloroprene and the like and other compounds containing the vinyl group such as styrene, acrylonitrile, etc. The alkali metal salts of dehydrogenated tall oil have been found to be excellent emulsifying agents, particularly in the preparation of the copolymers of butadiene and styrene or acrylonitrile, isoprene and styrene or acrylonitrile, and other rubber-like copolymers as well as in the preparation of polymers such as polyvinyl chloride, polyvinyl acetate, polystyrene, polymethyl methacrylate, polyvinylidene chloride and the various other addition polymers which may be prepared by the emulsion technique.

The polymerizations in which dehydrogenated tall oil soaps are used may be subjected to the same variations in reaction conditions, e. g., concentrations of reactants, temperature, pressure, etc., as those in which a fatty acid soap is used. The temperature of the reaction may vary from about 20° C. to about 100° C., preferably from about 40° C. to about 60° C., and the concentration of the emulsifying agent may be varied from about 1 to about 5%, preferably from about 2 to about 3%. The polymerization in general is carried out with the use of a peroxide catalyst such as potassium persulfate, tert.-butyl hydroperoxide, benzoyl peroxide, etc. Dehydrogenated tall oil soaps may also be used in combination with any desired initiator or other polymerization or processing aid.

What I claim and desire to protect by Letters Patent is:

1. The process which comprises polymerizing a water-insoluble organic compound containing the group $$CH_2=C<$$

and which is capable of being polymerized by a peroxide catalyst, in aqueous emulsion in the presence of an alkali metal salt of dehydrogenated tall oil as emulsifying agent.

2. The process which comprises copolymerizing two water-insoluble organic compounds containing the group $$CH_2=C<$$

and which are capable of being polymerized by a peroxide catalyst, in aqueous emulsion in the presence of an alkali metal salt of dehydrogenated tall oil as emulsifying agent.

3. The process which comprises polymerizing in aqueous emulsion a conjugated butadiene hydrocarbon in the presence of an alkali metal salt of dehydrogenated tall oil as an emulsifying agent.

4. The process which comprises copolymerizing in aqueous emulsion a mixture of a conjugated butadiene hydrocarbon and another water-insoluble organic compound containing the group $$CH_2=C<$$

and which is capable of being polymerized by a peroxide catalyst, in the presence of an alkali metal salt of dehydrogenated tall oil as emulsifying agent.

5. The process which comprises copolymerizing in aqueous emulsion a mixture of butadiene-1,3 and styrene in the presence of an alkali metal salt of dehydrogenated tall oil as emulsifying agent.

6. The process which comprises copolymerizing in aqueous emulsion a mixture of butadiene-1,3 and acrylonitrile in the presence of an alkali metal salt of dehydrogenated tall oil as emulsifying agent.

7. The process which comprises polymerizing a water-insoluble organic compound containing the group $$CH_2=C<$$

and which is capable of being polymerized by a peroxide catalyst, in aqueous emulsion in the presence of the sodium salt of dehydrogenated tall oil as emulsifying agent.

8. The process which comprises polymerizing in aqueous emulsion a conjugated butadiene hydrocarbon in the presence of the sodium salt of dehydrogenated tall oil as emulsifying agent.

9. The process which comprises copolymerizing in aqueous emulsion a mixture of butadiene-1,3 and styrene in the presence of the sodium salt of dehydrogenated tall oil as emulsifying agent.

10. The process which comprises copolymerizing in aqueous emulsion a mixture of butadiene-1,3 and acrylonitrile in the presence of the sodium salt of dehydrogenated tall oil as emulsifying agent.

RICHARD S. GEORGE.

REFERENCES CITED

The following references are of record in the file of this patent:

UNITED STATES PATENTS

| Number | Name | Date |
|---|---|---|
| 1,992,949 | Hodges | Mar. 5, 1935 |
| 2,377,647 | Pragoff | June 5, 1945 |
| 2,371,230 | Dressler et al. | Mar. 13, 1945 |
| 2,388,477 | Fryling | Nov. 6, 1945 |
| 2,397,201 | Pfau | Mar. 26, 1946 |
| 2,421,627 | LaCrosse | June 3, 1947 |

OTHER REFERENCES

Pollak et al., "Oil and Soap," April 1940, pages 87 to 89.